(12) United States Patent
Goerend

(10) Patent No.: US 6,996,978 B2
(45) Date of Patent: Feb. 14, 2006

(54) TORQUE CONVERTER STATOR

(76) Inventor: David J. Goerend, 119 N. Main St., St. Lucas, IA (US) 52166

( * ) Notice: Subject to any disclaimer, the term of this patent is extended or adjusted under 35 U.S.C. 154(b) by 1 day.

(21) Appl. No.: 10/839,086

(22) Filed: May 5, 2004

(65) Prior Publication Data

US 2005/0247054 A1 Nov. 10, 2005

(51) Int. Cl.
*F16D 33/00* (2006.01)
(52) U.S. Cl. .......................... 60/361; 60/345
(58) Field of Classification Search .................. 60/345, 60/351, 361, 362; 415/191, 211.2; 416/180, 416/197 C
See application file for complete search history.

(56) References Cited

U.S. PATENT DOCUMENTS

| | | |
|---|---|---|
| 2,755,628 A | 7/1956 | Mamo |
| 3,298,178 A * | 1/1967 | Reynolds ..................... 60/352 |
| 3,525,221 A | 8/1970 | Maxwell et al. |
| 3,828,554 A | 8/1974 | Hau |
| 4,180,977 A | 1/1980 | Beardmore |
| 4,186,557 A | 2/1980 | Arai et al. |
| 4,671,061 A | 6/1987 | Elderton |
| 5,125,487 A * | 6/1992 | Hodge ......................... 60/341 |
| 5,168,702 A | 12/1992 | Sakakibara et al. |
| 5,522,220 A | 6/1996 | Locker |
| 5,640,849 A | 6/1997 | Abe et al. |
| 5,836,157 A | 11/1998 | Kosuge |
| 6,065,287 A | 5/2000 | Yamamoto |
| 6,220,025 B1 | 4/2001 | Mauti et al. |
| 6,287,278 B1 | 9/2001 | Woehr et al. |
| 6,312,219 B1 | 11/2001 | Wood et al. |
| 6,644,916 B1 | 11/2003 | Beacom |

* cited by examiner

*Primary Examiner*—Thomas E. Lazo
(74) *Attorney, Agent, or Firm*—McKee, Voorhees & Sease, P.L.C.

(57) ABSTRACT

A torque converter stator for improved fluid coupling and acceleration is provided. The stator includes a plurality of circumferential long and short blades for increasing torque to an automatic transmission by employing reaction force produced when a flow transmission oil within the torque converter impinges an exterior surface of the blades. The stator utilizes the plurality of circumferential short blades for increasing torque during times a vehicle starting or accelerating and for permitting an obstructed fluid coupling in the turbine and impeller are a coupling point.

19 Claims, 4 Drawing Sheets

TORQUE CONVERTER STATOR

BACKGROUND OF THE INVENTION

The present invention relates to a torque converter stator used in a motor vehicle transmission. A torque converter is principally constructed to have three wheels, namely an impeller or pump, a turbine and a stator. These three components are joined together and its interior is filled with transmission oil. The impeller is connected to an input shaft of the torque converter and converts rotary force from the engine into flow of the oil through centrifugal force. The turbine that is connected to an output shaft of the converter receives the flow of the oil from the impeller and converts it into torque. The stator changes the direction of the flow of the oil leaving the turbine before the oil returned to the impeller, so as to perform a function of increasing the transmitted torque.

The oil is a transmitting medium that circulates between the input side and output side of the torque converter. The impeller and turbine are connected to the input and output shafts of the converter and are allowed to slide relative to each other. These two parts function as a clutch so as to make it easy for the vehicle to be started and absorbs shocks. These advantages promote torque converters for wide use in passenger cars and other types of motor vehicles.

The stator is an important part of the torque converter and various designs have been utilized in the prior art to improve engine economy during coasting, anti-creep idling, and for improved acceleration.

The stator is designed with two considerations in mind. First, when the car is just starting or accelerating, the stator takes the fluid flow from the turbine and redirects fluid so that it will not slow down the impeller and work against the engine. Second, when the car is running with high operational transmission oil flow, the stator's job is to get out of the way and let the fluid flow naturally and unobstructed.

Prior art stator designs have attempted to improve upon stator blade design by providing for variable pitch stator blades. However, the prior art stators with variable pitch are complicated and subject to wear. Accordingly, it is an objective of the current invention to utilize a stator which provides the benefits of variable pitch stators but in a unit or member, preferably cast in one-piece.

Moreover, conventional hydraulic torque converters include a stator having a one-way clutch which, when it is locked to deflect oil back to the impeller from the turbine. When a sufficient speed ratio between the turbine and impeller is achieved (i.e., the turbine and the impeller are turning at almost the same speed), the one-way clutch of the stator assembly free-wheels because fluid coming from the turbine strikes the back side of the stator blades. Accordingly, an objective of the present invention is to utilize the benefits of a free-wheeling stator during both low and high transmission oil flow.

Stator blades encounter varying transmission oil centrifugal forces during operation. For example, during low speed operation the oil is relatively uniform throughout the entire expanse of the stator but during high transmission oil flow, the oil is directed to the outside of the stator by centrifugal force. Accordingly, it is a still further objective of the present invention to provide a stator design which utilizes the centrifugal forces encountered by a stator.

It is a further objective of the present invention to provide a torque converter which overcomes the disadvantages of the prior art.

It is a still further objective of the present invention to provide a stator which is a simplified form, and is therefore less costly in production and use.

These and other objectives will become apparent from the following description of the invention.

SUMMARY OF THE INVENTION

The foregoing objectives may be achieved using a stator with long and short blades that increase torque to an automatic transmission by employing reaction force produced when a flow of transmission oil within the torque converter impinges an exterior surface of the blades. The plurality of circumferential short blades are for increasing torque during times a vehicle is starting or accelerating and for permitting unobstructed fluid coupling when the turbine and the impeller are at a coupling point.

According to another feature of the present invention, the stator has a bossed portion and a circumferential ring portion, the long blades attached to the boss portion and the circumferential ring portion and the short blades only attached to the boss portion.

According to another feature of the present invention, the short stator is approximately 30%–60% of the long length of the long blade.

According to a still further feature of the present invention, the long and short blades are in close proximity to the impeller blades and extend beyond a stator plane defined by the impeller facing side of the circumferential ring.

According to a still further feature of the present invention, a stator has a one-way clutch that prevents movement from the stator during times of increasing torque and permits idling at the coupling point.

According to a still further feature of the present invention, a stator is produced in a one-piece configuration.

According to a still further feature of the present invention, the stator has an equal number of long and short blades and alternates them around the perimeter of the stator.

DETAILED DESCRIPTION OF THE PREFERRED EMBODIMENT

Figure 1:
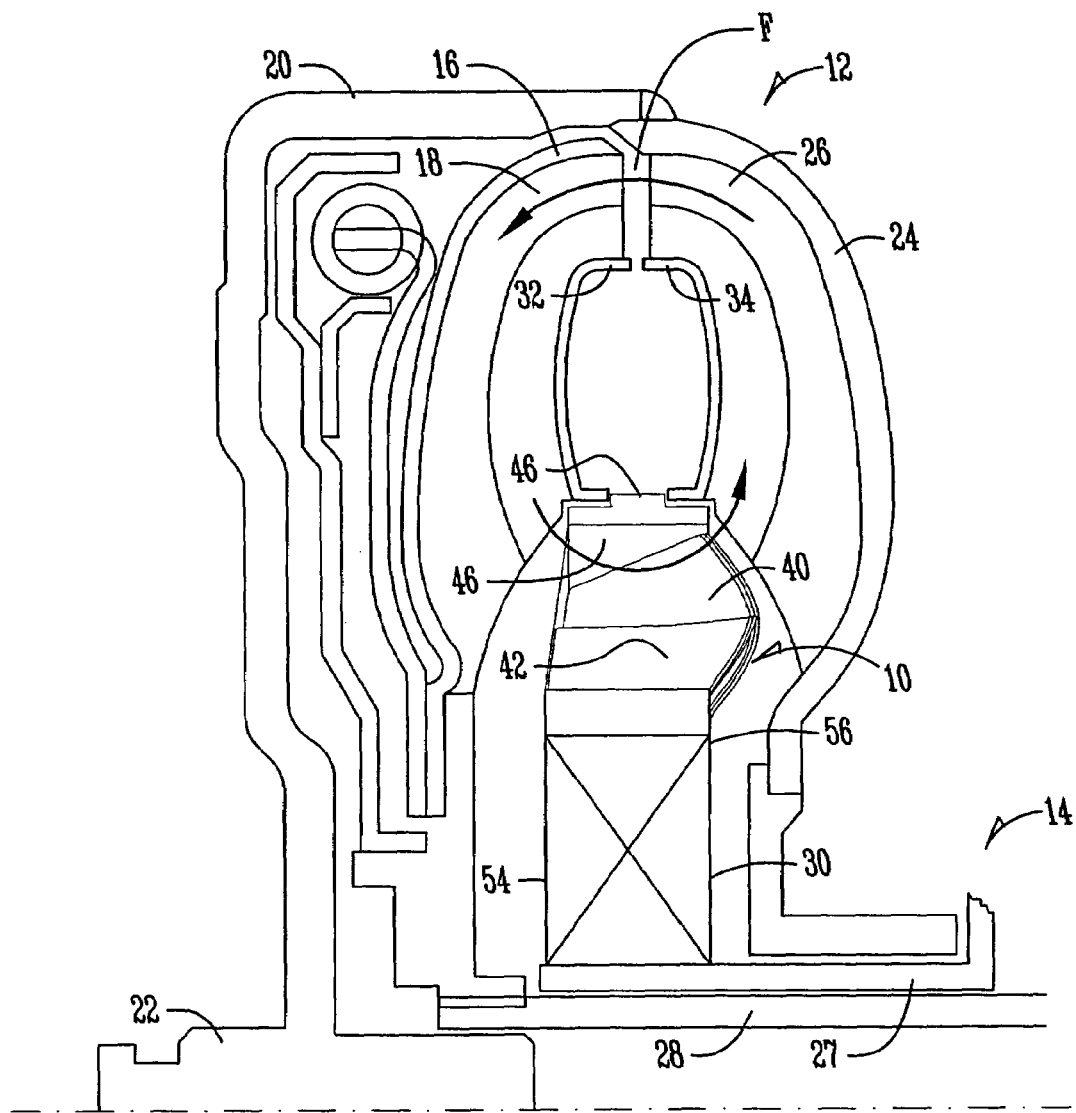
FIG. 1 is a cross-sectional view of the stator in use showing the fluid flow between the impeller, turbine, and stator.

With reference to the drawings, reference numeral 10 generally designates a torque converter stator. In FIG. 1, the torque converter stator 10 is shown in use in a torque converter 12 used in an automatic transmission.

Within the torque converter 12, a turbine 16 is provided having blades or vanes 18. A converter shell 20 is rotatably attached to an input shaft 22 and an impeller or pump 24 is fixed to the converter shell 20. The impeller has blades or vanes 26. The output of an engine (not shown) is transmitted to the input shaft 22.

The turbine 16 is disposed in the converter shell 20 such that its oil inlet side faces the oil outlet side of the impeller 24. The turbine 16 is coupled to an output shaft 28 of the torque converter 12 that serves as an input into the transmission 14.

The stator 10 is disposed between the turbine 16 and the impeller 24. The stator 10 is attached to a hollow stationary shaft 27 via a one-way clutch 30. The output shaft 28 slides up through the hollow stationary shaft 27 and is attached to the turbine. A circulation path is formed through which an oil flows in the direction of arrows in FIG. 1 when the impeller 24 is rotated. The impeller 24 and turbine 16 have cores 32, 34 so as to increase the rigidity with which each blade array is mounted and to partially define the oil circulation path.

Figure 2:
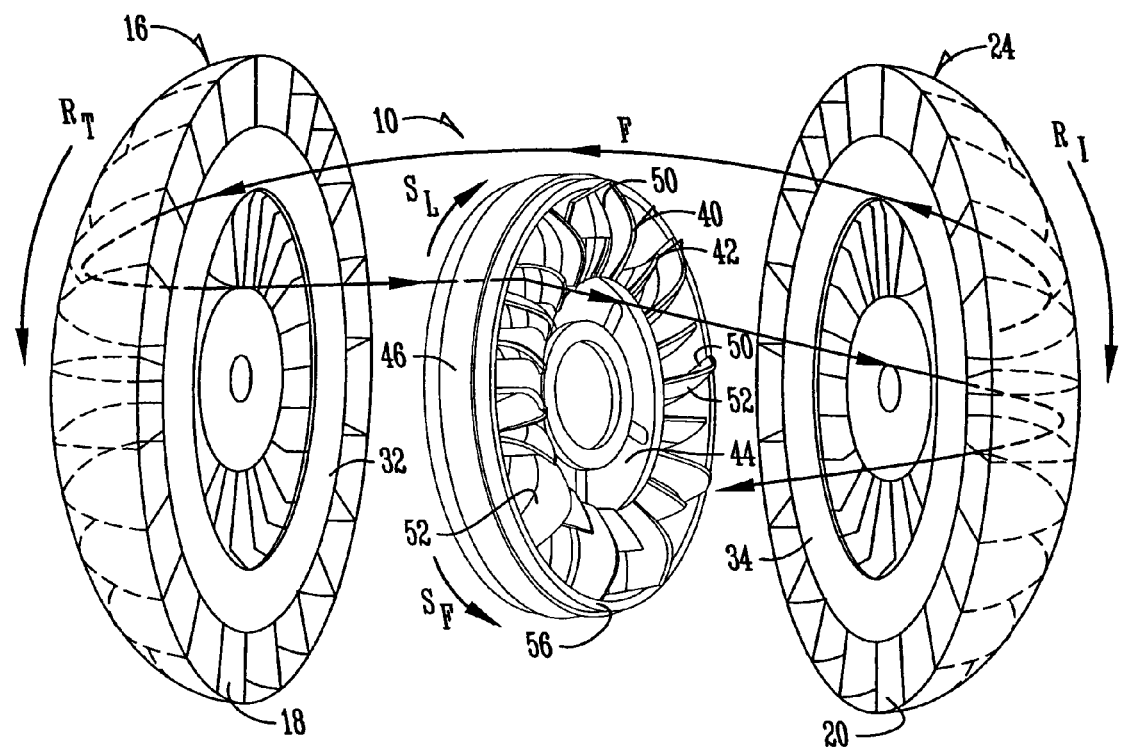
FIG. 2 is an exploded view of the turbine, impeller, and stator in between. This Figure illustrates the flow of the transmission oil through these three parts and illustrates the rotational direction of the parts.

As seen in FIG. 2, fluid moves through the torque converter along path F. The rotation of the turbine and impeller are illustrated by arrows Rt and Ri, respectively. The rotation of the stator 10 is indicated by Sf which stands for stator free-wheeling direction and S1 stands for stator locked position.

Figure 3:
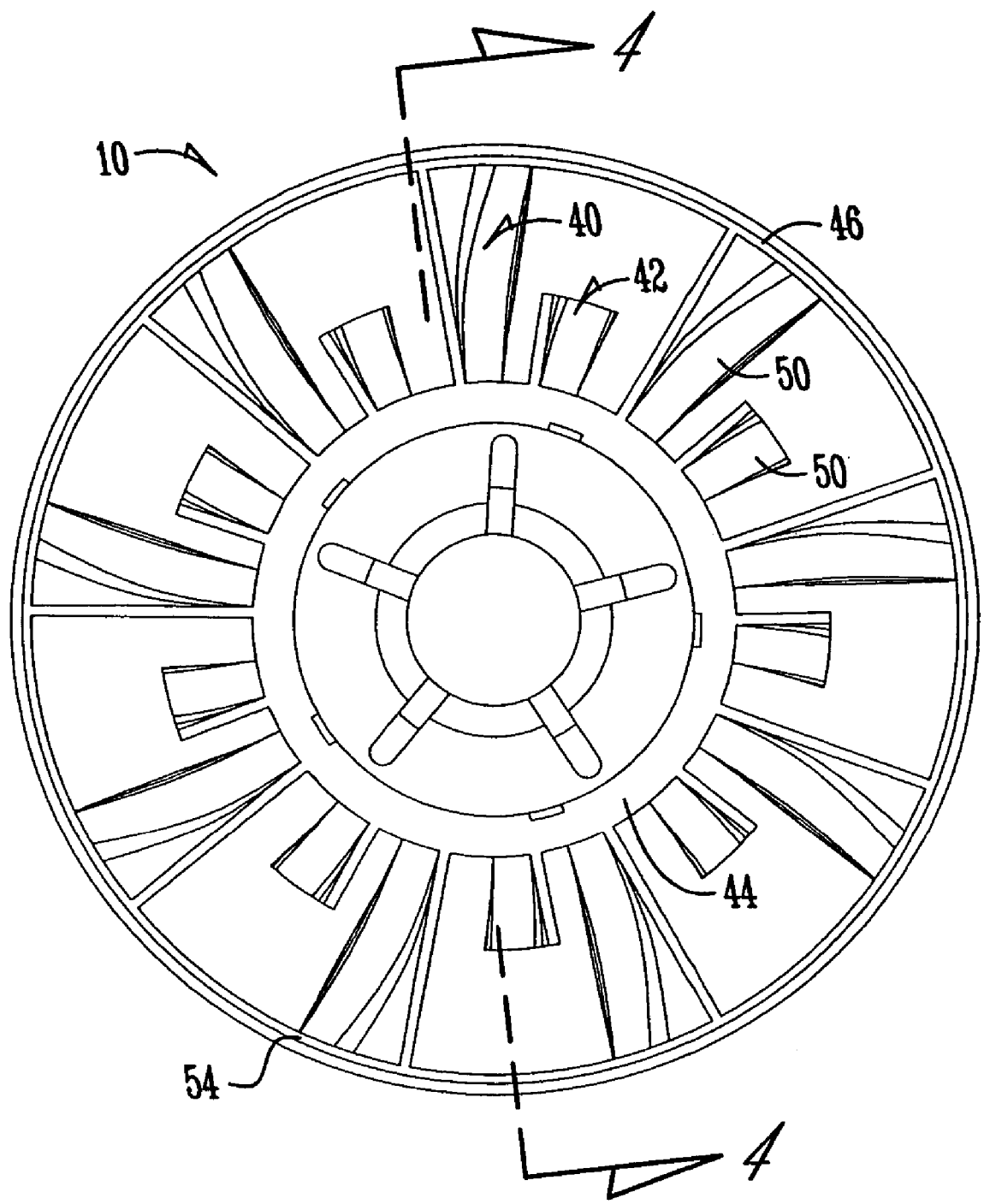
FIG. 3 is a top view of the stator of the present invention.

As seen in FIG. 3, the stator 10 has a plurality of long blades 40 and short blades 42. These blades 40, 42 cooperate to increase torque which is input to the automatic transmission by employing reaction force which is produced when a flow of oil within the torque converter impinges an exterior surface of the blades. The long blades 40 are provided radially on the circumference of a boss portion 44 and extend to an outer circumferential ring portion 46 so as to become integral with both the boss portion 44 and the circumferential ring portion 46.

The short blades 42 are provided radially on the circumference of the boss portion 44 and terminate short of the circumferential ring portion 46.

The distance between the boss portion 44 and the circumferential ring 46 is approximately 4.2 centimeters (cm). The long blades 40 extends the entire 4.2 cm. In contrast, the short vane 42 extends approximately 1.9 cm from the boss portion 44 or approximately 45% the length of the long blade. The short blade may be sized to be between 30%–60% the length of the long blade. Alternatively the short blade may be any percentage of length of the long blade.

Figure 4:
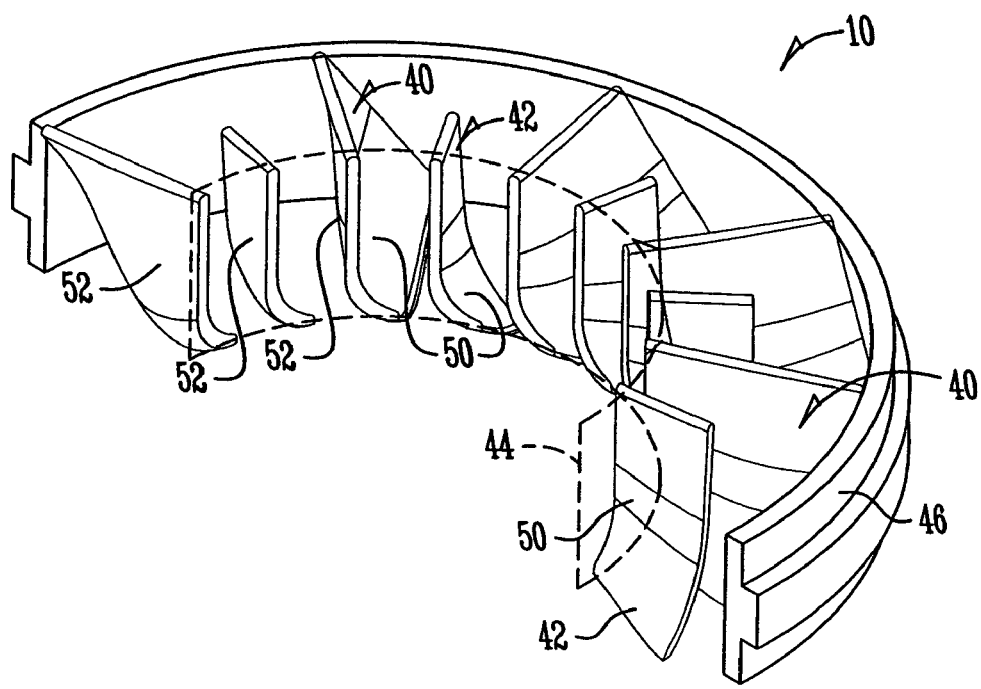
FIG. 4 is a cross-sectional view taking along line 4—4 of FIG. 3.

As seen in FIGS. 2 and 4, the stator blades 40, 42 have a front side 50 and a back side 52. The one-way clutch 30 prevents movement of the stator 10 when oil impinges the front side 50 and permits movement (i.e., idling) when oil impinges the back side 52 when at a coupling point as described below.

Figure 5:
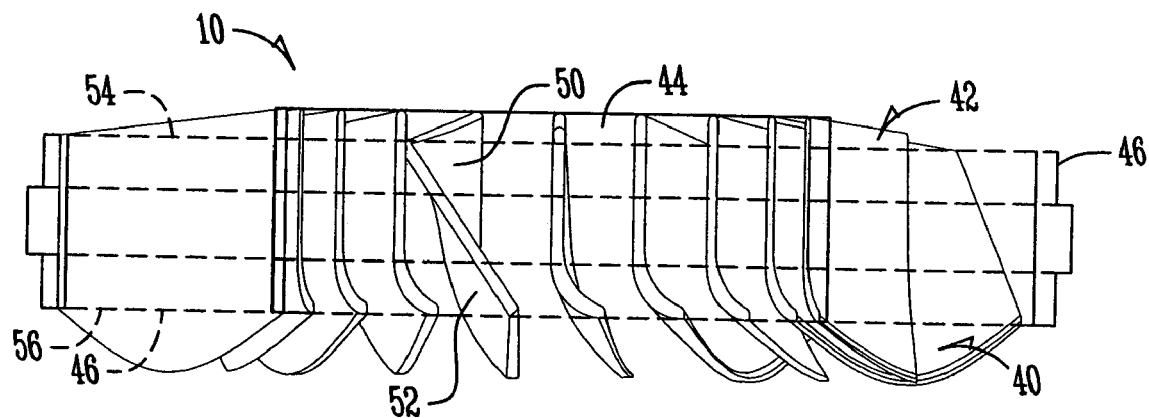
FIG. 5 is a side view of the stator as illustrated in FIG. 4.

The stator 10 has blades 40, 42 in close proximity to the blades 26 of the impeller 24. In this position, the blades 40, 42 improve acceleration by changing the direction of transmission oil better so that it does not hit the impeller at an incorrect angle. As seen in FIGS. 1 and 5, the stator blades 40, 42 extend beyond a stator plane defined by the impeller facing side 56. Opposite the impeller facing side 56 is the turbine facing side 54.

The stator 10 is constructed as one-piece. A shown in the figures, the stator 10 has eighteen blades 40, 42 with nine long blades 40 and nine short blades 42. The blades 40, 42 alternate between long blade 40 and short blade 42. It is to be understood that any number of short and long blades 40,42 may be used.

The long and short blades 40, 42 cooperate to redirect oil when there is a large speed ratio between the impeller and turbine. As the speed ratio between the impeller and turbine approaches 1:1, the windows that are created by having a short vane 42 permit better coupling of the impeller 24 and the turbine 16 such that oil flows better. In operation, the stator 10 serves to change the direction of flow of oil. As the speed ratio approaches 1:1 where the impeller 24 and turbine 16 are rotated at substantially the same speed, the direction of flow of the oil into the stator 10 is changed and causes a reverse affect as oil strikes a back side of the blades 40, 42. In this case, therefore, the stator 10 is brought into an idling condition by means of a one-way clutch 30 where the stator 10 free-wheels. As a result, the oil flows into and out of the stator 10 in substantially the same direction and the stator 10 does not exert a force to change the flow direction of oil. At this point of operation, the stator is at a "coupling point". At the coupling point, the predominant amount of oil is thrown to the outside of the stator thereby the blades 40, 42 do not inhibit the flow of oil.

Changes in the direction of flow of the oil toward each blade 40, 42 of the stator will now be described. When a vehicle is just starting or accelerating, the oil strikes the front side 50 (concave side) of a blade 40, 42 of the stator 10 and the direction is changed by the maximum angle because the one-way clutch 30 prevents the stator 10 from rotating. When the speed ratio changes until it reaches the coupling point, the oil flows into and out of the stator 10 by substantially the same angle. The speed ratio is further increased to be close to one, the flow of oil hits the rear face 52 (convex face) of the blade 40, 42 and the stator is brought into an idling position.

The oil striking the rear face of the blades 40, 42 interrupts the smooth flow of oil between the impeller 24 and turbine 16. The windows provided by using short blades 42 increases the flow rate of the circulating oil as compared to a stator only having long blades 40.

The invention has been shown and described above with the preferred embodiments, and it is understood that many modifications, substitutions, and additions may be made which are within the intended spirit and scope of the invention. In the foregoing, it can be seen that the present invention accomplishes all of the stated objectives.

What is claimed is:

1. A stator for use between a turbine and impeller of a torque converter, the stator comprising:

a plurality of circumferential long and short blades for increasing torque to an automatic transmission by employing reaction force produced when a flow of transmission oil within said torque converter impinges an exterior surface of the blades;

the plurality of circumferential short blades for increasing torque during times of vehicle starting or accelerating and for permitting unobstructed fluid coupling when the turbine and impeller are at a coupling point.

2. The stator of claim 1 further comprising a boss portion and a circumferential ring portion, the long blades attached to the boss portion and the circumferential ring portion, the short blades attached to the boss portion and terminating short of the circumferential ring portion.

3. The stator of claim 2 wherein the long stator is approximately 4.2 cm long and the short stator is 1.9 cm long.

4. The stator of claim 2 wherein the short blade is between 30%–60% the length of the long blade.

5. The stator of claim 4 wherein the short blade is approximately 45% the length of the long blade.

6. The stator of claim 2 wherein the plurality of circumferential long and short blades are in close proximity to the impeller blades and extend beyond a stator plane defined by the impeller facing side the circumferential ring.

7. The stator of claim 1 wherein the stator is one-piece.

8. The stator of claim 1 further comprising a one-way clutch preventing movement of the stator during times of increasing torque and permitting idling at the coupling points.

9. The stator of claim 1 wherein the plurality of blades number eighteen.

10. The stator of claim 9 wherein the plurality of blades comprises nine long blades and nine short blades.

11. The stator of claim 10 wherein the plurality of blades alternate between long blade and short blade.

12. A torque converter for a motor vehicle transmission, comprising:
   a turbine;
   an impeller;
   a stator between the turbine and the impeller;
   a plurality of long blades extending within the stator;
   a plurality of short blades extending within the stator;
   the long and short blades redirecting fluid flow through the stator during initial acceleration of the vehicle until the stator reaches a rotational coupling point with the impeller and turbine, after which the fluid flows through the stator substantially free from redirection by the long and short blades.

13. The torque converter of claim 12 wherein the stator is stationary prior to the coupling point and free wheels after the coupling point.

14. The torque converter of claim 12 further comprising a one-way clutch connected to the stator to allow rotation of the stator in only one direction.

15. The torque converter of claim 14 wherein the clutch precludes rotation of the stator during initial acceleration and permits rotation of the stator at the coupling point.

16. The torque converter of claim 12 further comprising a boss portion and a circumferential ring portion, the long blades attached to the boss portion and the circumferential ring portion, the short blades attached to the boss portion and terminating short of the circumferential ring portion.

17. The torque converter of claim 16 wherein the long and short blades extend laterally beyond a plane defined by the circumferential ring.

18. The torque convener of claim 12 wherein the long and short blades alternate within the stator.

19. The torque convener of claim 12 wherein the long and short blades have opposite front and rear surfaces, the fluid impacting the front surface during initial acceleration and the fluid impacting the rear surface after the coupling point is reached.

* * * * *